July 28, 1970   A. C. SCHOUW   3,521,973
FAN CONSTRUCTION
Filed Aug. 16, 1968   2 Sheets-Sheet 1
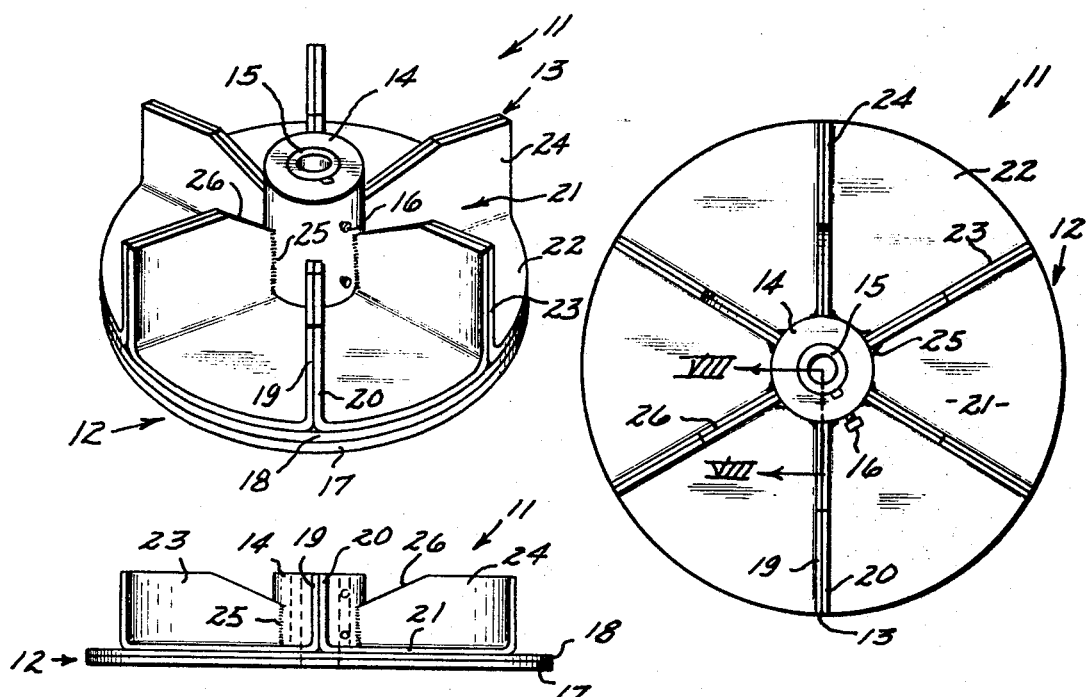
FIG. 1
FIG. 2
FIG. 3
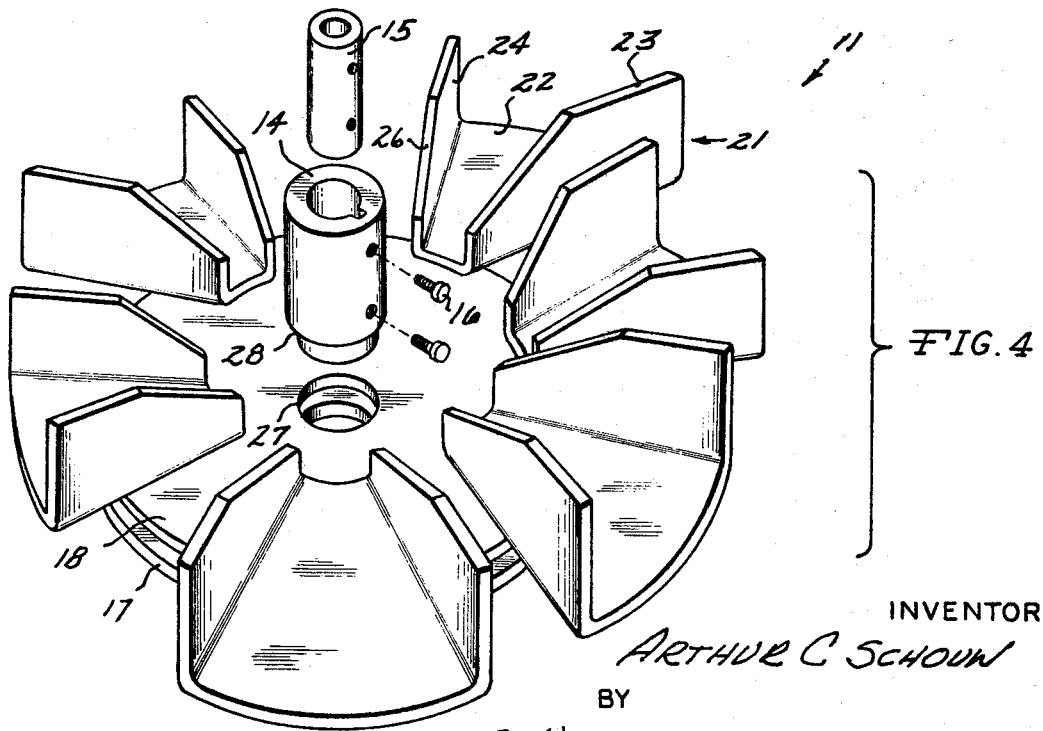
FIG. 4
INVENTOR
ARTHUR C SCHOUW
BY
Miller Morris Pappas & McLeod
ATTORNEYS July 28, 1970   A. C. SCHOUW   3,521,973
FAN CONSTRUCTION
Filed Aug. 16, 1968   2 Sheets-Sheet 2

INVENTOR
ARTHUR C. SCHOUW
BY
Miller Morris Pappas & McLeod
ATTORNEYS

United States Patent Office 3,521,973
Patented July 28, 1970

3,521,973
FAN CONSTRUCTION
Arthur C. Schouw, Corunna, Mich., assignor to Anpol Research Corporation, Owosso, Mich., a corporation of Michigan
Filed Aug. 16, 1968, Ser. No. 753,142
Int. Cl. F04d 29/02, 29/28; B23p 15/04
U.S. Cl. 416—185                    4 Claims

ABSTRACT OF THE DISCLOSURE

A fan construction particularly for centrifugal blowers and the like for left and right rotation in which the material comprising the fan, base, blade and hub are of resin materials, so laminated as to provide excellent strength and to make available a fully corrosion resistant structure for handling contaminated gases and the like and where the resin in motion contributes an electrostatic charge to contaminant particles.

BACKGROUND OF THE INVENTION

In electrostatic systems for removal of contaminants from liquids and gases the use of variant resin materials has been desirable in the blade form. As a consequence, cast resin structures have been used but they present considerable difficulty and expense in preparation. Coated structures have also been used as where the core form is dipped and cured. Aside from the contribution to an electrostatic charge imparted to the particle in movement the blades must also resist corrosion as from a broad spectrum of corrosive contaminants. Known resin fan blades have been dangerous where embrittlement causes the fan and blades to come apart at high speeds and at consequent high velocities. This is true of the cast blades and also true of coated blades. Accordingly, the present invention is directed to a new and useful fan construction in which the diffculties encountered in the prior art are minimized.

SUMMARY

The present invention has as its principal object the fabrication of fans from resin sheet stock to provide corrosion resistance of the resin and to provide a laminar construction in which the securing means of blades, base disc and hub is substantially integral and accurate.

Another object is to provide a safer resin fan construction for centrifugal blowers and the like.

Another object is to provide a resin blade system useful in left and right rotation installations so as to reduce fan inventory.

Still another object is to materially reduce the cost of fan fabrication while providing fans incorporating electrostatic properties and corrosion resistance.

Other objects will be appreciated by those skilled in the art of fan construction as the description proceeds.

In the drawings:

FIG. 1 is a perspective view of a fan construction in accord with the present invention.

FIG. 2 is a top plan view of a fan construction as seen in FIG. 1.

FIG. 3 is a side elevation view of a fan construction as seen in FIG. 2.

FIG. 4 is an exploded perspective view of the fan of the present invention illustrating the construction thereof from resin sheet stock and indicating the assembly relationship of parts.

GENERAL DESCRIPTION

Figure 5:
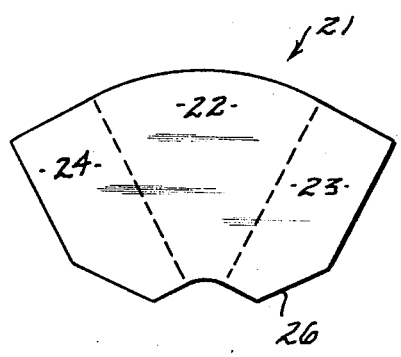
FIG. 5 is a top plan view of a blade segment and indicating fold lines.

In general the laminar fan construction is accomplished using sheet or flat resin stock and is thereupon laminated together in association with a hub so as to comprise a substantially integral resin system. This comprises a disc base which is reinforced by placing two discs in adjacent registering plane contact relation and having a central axial opening therethrough to accommodate location of a tubular resin hub. The blades or vanes are prepared as segments having up-turned flanges which extend radially from the hub flanking the segment shaped web portion. Plural of these segments are arranged on the discs and are solvent cemented or otherwise integrated to the discs as by head bonding, for example, with similar treatment of adjacent flanges. The flanges when thus laminated together form the vanes or blades of the fan and at their radial center extension intersect and abut the hub. The intersection of hub and vane is the positon for a resin weld which secures the vane material in strengthening and integral buttress relation to the hub. Bushings, as desired, may be pressed into the hub. The resulting product is an all resin fan superior in precision to cast products and well reinforced against destructive centrifugal forces encountered in use. The fan construction is from the flat or sheet resin stock thereby eliminating expensive patterns and fixtures and the radial and symmetrical orientation of the blades makes the fan useful in right and left hand blowers. In addition the construction accommodates a wide range of thermoplastic materials useful in various settings to provide variant corrosion resistances.

SPECIFIC DESCRIPTION

Referring to the drawings and with particularity to FIG. 1 the complete fan construction 11 of the present invention is clear. The fan comprises a disc base 12 and a plurality of blades or vanes 13. These are arranged around a hub 14 which may also include a bushing 15 and fastener 16 radially passing tthrough the hub 14 for attachment to a drive shaft, not shown. The disc base 12 is laminated from flat stock. As shown, two or more identical sheets 17 and 18 of resin material are simply shaped in plane circular disc form and are joined together as by solvent cementing in face to face relation to provide the integral strengthened base 12. The blades 13 are also formed by lamination of two layers or resin stock 19 and 20 in identical shaped form of vane halves which are joined together in plane relation as by solvent cementing. The blades 13 are thus formed by identical adjacent segments 21 having a channel segment shaped web base portion 22 and identical upturned and radially disposes legs 23 and 24. When thus up-turned the legs 23 and 24 extend radially from the hub 14 and the segments 21 thus fill or cover the disc base 12 in plan view. The intersections 25 at hub 14 are resin welded or otherwise integrally joined to the hub 14 and thereby provide a strengthening buttress in radial support of the hub 14. A relief 26 is provided adjacent the hub 14, the angle of which relief 26 may be selected in accord with axial input to the fan 11. The fan 11 is further understood in its assembled relation by reference to FIGS. 2 and 3.

In FIG. 4 the individual parts comprising the laminated fan structure 11 are shown in their exploded relation and clearly indicate the folded relationship of the vane segments 21 as assembled in adjacent radial plane contact with each other and with the webs 22 in horizontal plane relationship with the upper disc 18 of the base 12. The base 12 comprises identical joined elements 17 and 18. The FIG. 4 also shows the central opening 27 through both plates 17 and 18 to support, upon assembly, the hub 14 on shoulder 28 and thus providing a secure arrangement for integral attachment of base 12 to hub 14. The radial assemblage of vane segment 21 to ultimate buttress against the hub 14 is also indicated.

Figure 7:
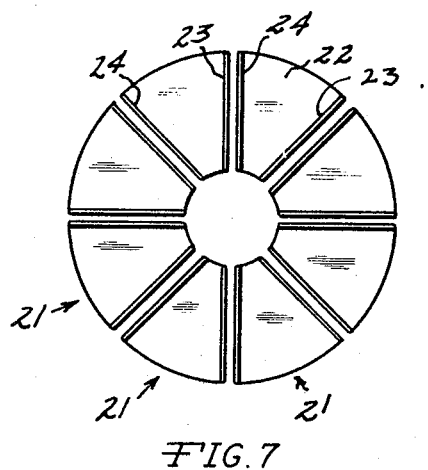
FIG. 7 is a composite top plan view of plural blade segments prior to joining and indicating how adjacent legs are laminated together to form individual vanes or blades.
Figure 6:
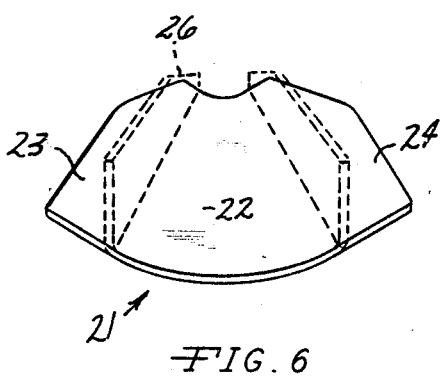
FIG. 6 is a perspective view of the segment shown in FIG. 5 and indicating how the legs are folded from the flat.
Figure 8:
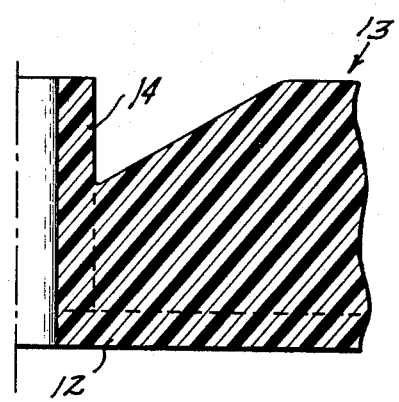
FIG. 8 is a partial section elevation view and indicating the connection of blade to hub.

FIG. 5 illustrates the flat pattern cut of vane segment 21 and the fold lines providing the upstanding legs 23 and 24 connected by web 22 and with the relief cut 26 are shown in phantom line. FIG. 6 indicates the folding of the segment 21 shown in FIG. 5 to provide the finished segment. The folding and forming from the flat sheet is easily accomplished with a simple form to provide repetitive accuracy and the thermoplastic material is heated so that the form of the segment 21 once established, is maintained. The segments 21 are thereupon grouped as shown in FIG. 7 so that the upstanding legs 23 and 24 are in adjacent parallel relation for bonding together to form the radial vanes 13 seen in the FIGS. 1, 2 and 3. In FIG. 8 the final bonding to provide integrity as between hub 14, base 12, and vanes 13 and including the plane securing of legs 23 and 24 together is indicated.

Figure 9:
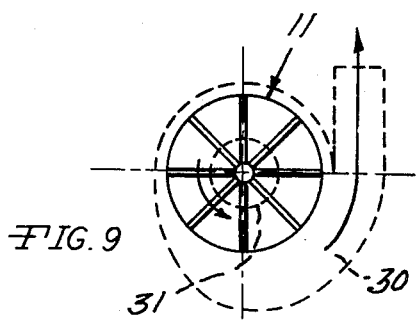
FIG. 9 is a top plan view of a fan construction in a counter clockwise installation in a blower shown in phantom line.
Figure 10:
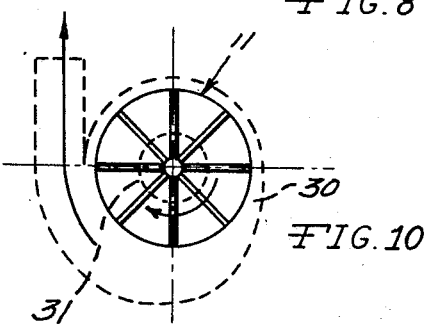
FIG. 10 is a top plan view of a fan construction in a clockwise installation in a blower shown in phantom line.
Figure 11:
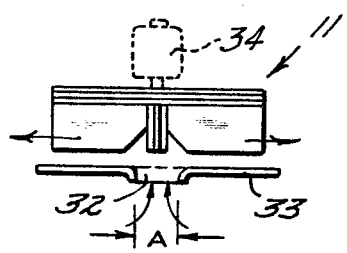
FIG. 11 is a schematic side elevation view of the fan construction with motor drive attached and illustrates the axial input and centrifugal output.

FIGS. 9, 10 and 11 illustrate use settings for the fan 11 in either right or left hand rotational environment and located in a volute housing 30 with air delivery being indicated by the openings 31 to the eye of the impeller or fan 11. Such entry is adjusted either by sizing of the opening 31 or adjustment of the angle 26 as seen in FIGS. 1, 2 and 3 in the construction of the fan.

FIG. 11 illustrates a modified use of the fan 11 where delivery to the blades 13 is through the entry 32 sized at A and defined by the closure 33. Radial delivery of the air or gas is peripheral whether rotation is right or left hand and rotation of the fan 11 is imparted by the motor 34 driving the fan 11. While reference is made to a fan 11, it will be appreciated that the fan could be termed an impeller.

Fans prepared in the above indicated manner and in structural accord with this specification have found use in separators and in scrubbers and blowers of all types to provide an all-resin fan system of remarkable durability, balance, corrosion resistance and utility. The thermoplastic resin sheet material is selected for desired resistance to corrosive environment and for desired properties of imparting electrostatic charge to particles passing through the fan. The simplicity, economy, and ease of dimensional modification from sheet or flat stock to suit variant use setting is easily discernible by those skilled in the art.

Having thus described my invention by reference to a specific embodiment thereof and a description of the process for its construction those skilled in the art will readily appreciate changes, modifications and improvements adapting the structure to particular use settings and such changes, modifications and improvements are intended to be included herein limited only to the scope of the hereinafter appended claims.

I claim:
1. A laminar fan blade construction for centrifugal blowers and the like comprising:
  a disc base plate of flat circular configuration and defining an axial opening through the center thereof;
  a plurality of blade elements each having a flat segment base and upstanding radially disposed legs said segment bases registrably assembled and secured to said disc base and surrounding said axial opening through said base disc and each leg in plane adjacent contact register with each adjacent leg and each pair of adjacent legs being secured together; and
  a hub through said opening in said base supported in axial registry with said opening by the legs of said blade elements and secured thereto.
2. The laminar fan construction of claim 1 wherein said disc base, said blade, and said hub are made from thermoplastic resin material.
3. The laminar fan of claim 2 wherein the thermoplastic material is polyvinyl chloride and blends of other resins.
4. The laminar fan construction of claim 1 in which the contact areas of blade elements to each other, hub to blade, and blades and hub to disc base is by solvent and adhesive securing to provide a substantially integral connection therebetween.

References Cited

UNITED STATES PATENTS

| 1,893,184 | 1/1933 | Smellie | 230—134 |
| 1,895,488 | 1/1933 | Reisinger | 230—134 |
| 2,344,444 | 3/1944 | Malczewski | 230—134 |
| 2,967,014 | 1/1961 | Pabst | 230—134 |

FOREIGN PATENTS

| 414,593 | 8/1934 | Great Britain. |
| 733,578 | 7/1955 | Great Britain. |

HENRY F. RADUAZO, Primary Examiner

U.S. Cl. X.R.

29—156.8; 416—241